Sept. 28, 1954     M. J. DEN HERDER     2,690,432
FOAM LIFT IN CHEMICAL PROCESSING SYSTEM
FOR PRODUCING ALUMINA SOLS
Filed Nov. 30, 1951     2 Sheets-Sheet 1

INVENTOR.
Marvin J. Den Herder
BY Everett A. Johnson
ATTORNEY

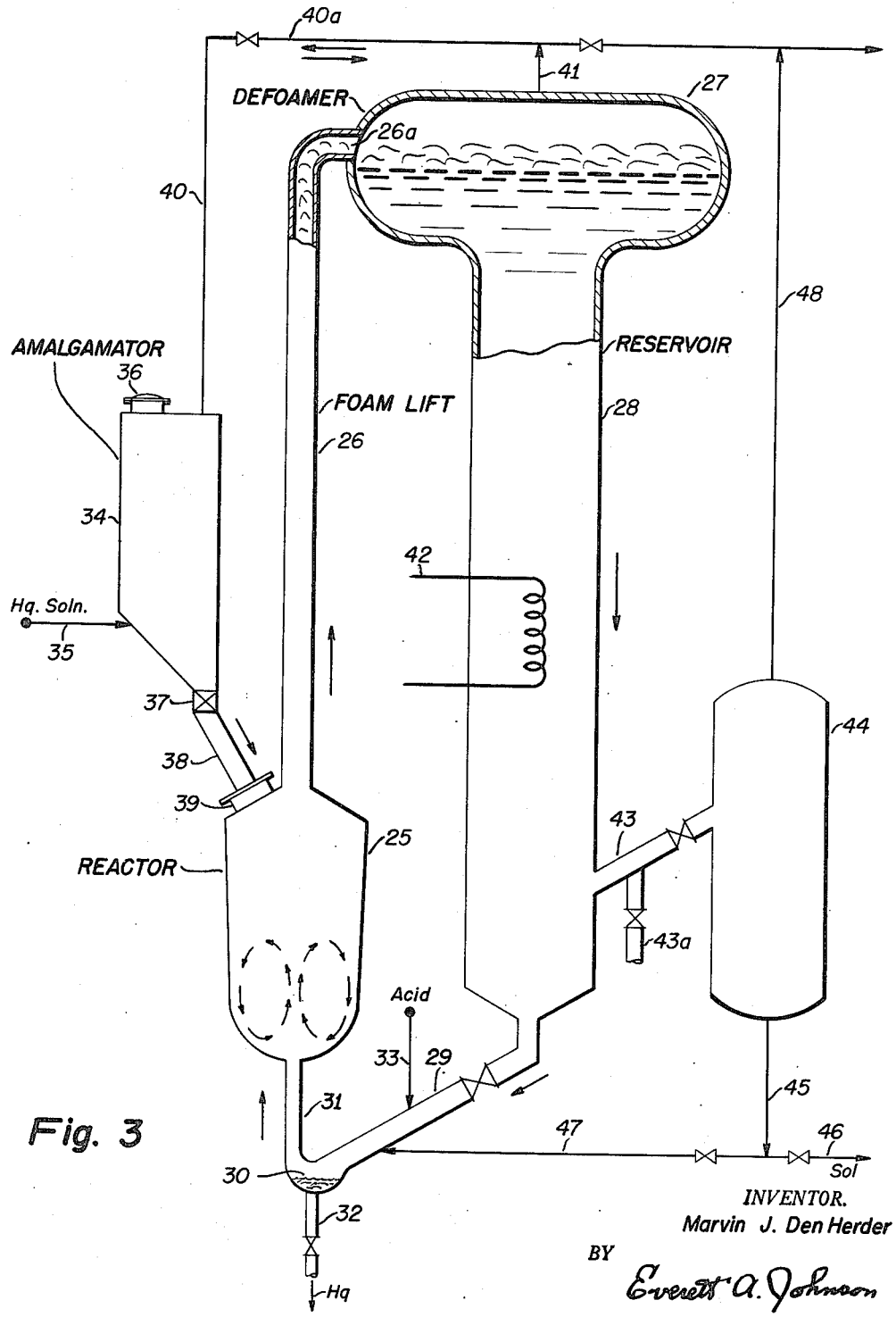

Patented Sept. 28, 1954

2,690,432

UNITED STATES PATENT OFFICE 2,690,432

FOAM LIFT IN CHEMICAL PROCESSING SYSTEM FOR PRODUCING ALUMINA SOLS

Marvin J. Den Herder, Chicago, Ill., assignor to Standard Oil Company, Chicago, Ill., a corporation of Indiana Application November 30, 1951, Serial No. 259,140

6 Claims. (Cl. 252—313)

This invention relates to apparatus which provides circulation and mixing for conducting chemical reactions without the use of expensive mixers and pumps. More specifically the invention relates to method and means for preparing alumina sols from aluminum metal.

One method of preparing a support component of a catalyst of the alumina gel type is to dry an alumina sol resulting from the reaction of amalgamated aluminum with dilute acetic or formic acid. Heretofore the alumina sol has been prepared in a series of vats equipped with mechanical stirrers to agitate the mixture during the reaction of the aluminum and acetic acid. Such operations have required equipment which is both costly and difficult to maintain and control. Furthermore, a foam is produced by the liberation of hydrogen during the preparation of the sol and this troublesome phenomenon has required special defoaming equipment. Moreover, as the reaction proceeds the viscosity of the sol increases greatly and the evolved hydrogen produces a foam which may increase in volume until it occupies several times the volume of the reacting liquid. Thus the foam difficulty has limited the capacity of catalyst preparation equipment thereby further increasing the cost of such operations. Another difficulty has been that the reaction time in the production of the alumina sol has been excessive, as long as 24 hours or more being required at temperatures around 150° F. to carry the reaction to substantial completion. The rate of sol production is usually limited by the rate of defoaming and large volumes of foam have heretofore limited the rate at which the sol may be formed from the metal. Also, the alumina sol produced by prior methods and equipment tends to retain objectionably high proportions of mercury which gives rise to a serious hazard during the subsequent drying of alumina compositions prepared from such sol.

One object of this invention is therefore to produce alumina sols rapidly and inexpensively on a commercial scale. More specific objects are the provision of methods and means for producing uniform quantities of alumina sols substantially without interruption. A more specific object of the invention is to provide means for the preparation of alumina sols at a more rapid rate than heretofore. An additional object is to reduce the time required for reacting the aluminum metal with water in the preparation of alumina sols. A further object is to eliminate the disadvantages arising from the production of the heavy foam. A more specific object is to provide an apparatus adapted to utilize the foam produced in the reaction for circulating the reactants without the use of separate mechanical pumps or mixers. Other objects of my invention and its advantages over the prior art will become apparent as the description thereof proceeds.

Briefly according to my invention I effect rapid circulation of the reactant liquid and agitation of the amalgamated aluminum in the reactor by utilizing the pressure difference between a column of low density foam or aerated liquid and a column of a high density liquid. The low density foam column superposes a reactor and an elevated defoaming chamber superposes the column of high density liquid in a reservoir. The bottom of the liquid reservoir and the bottom of the reactor are linked by suitable conduit means.

The defoamer chamber is of large area relative to the cross-sectional area of the foam lift so as to facilitate the breaking of the foam. Means is provided for withdrawing vapors and hydrogen from the defoamer and a heat exchanger means is used within the reservoir to control the reaction temperature.

Hydrogen liberated in the reactor and the aerated liquid or foam produced therein fills the top of the reactor and passes upwardly within the foam duct leading from the reactor to the defoamer. The reactants in the reservoir are in the liquid phase, and the density difference between the column of foam in the foam duct and the column of liquid in the reservoir causes rapid and positive circulation of liquid upwardly through the reactor and foam from the reactor through the lift leg into the defoamer above the reservoir. The amount of liquid circulating through the reactor is controlled by the quantity of hydrogen liberated and foam produced which in turn is related to the temperature and availability of the reactive aluminum in the reactor.

As the reaction proceeds the concentration of the alumina in the solution increases and when the desired concentration, for example 5%, is reached, the sol is removed at some convenient point and water containing small proportions of acetic or formic acid is injected at some other point adjacent the inlet to the reactor. The removal of the alumina sol and the addition of make-up liquid reactant can be a batch operation or can be effected slowly and continuously while maintaining the average alumina concentration at the desired level. Pellets of amalgamated aluminum can be added to the reactor as needed to maintain the desired alumina production rate. However, the aluminum need not be pre-amalgamated because the pellets become amalgamated upon contact with the amalgamated pellets already in the reactor.

My invention is illustrated by the drawings wherein:

Figure 3 is a diagrammatic representation of an alternative form of apparatus incorporating my invention.

Figure 1:
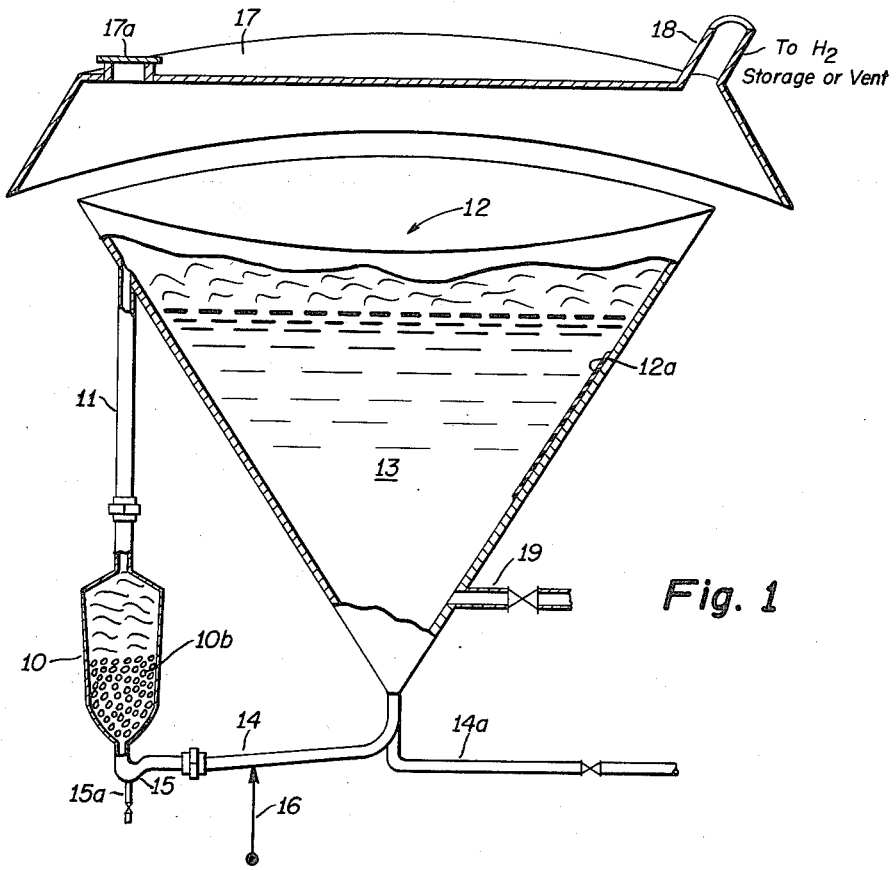
Figure 1 is an elevation, partly in section, of an apparatus for carrying out my process in a continuous operation.

Referring to Figure 1, amalgamated aluminum pellets are supplied to the reactor 10 by means of foam duct 11 or a separate solids inlet. A typical reactor may be fabricated from wood or welded stainless steel sheet and may be five to eight feet in length and 20 to 36 inches in diameter. A bottom inlet 14 may be of from two to four inches in diameter and the foam duct 11 may be between about six and twelve inches in diameter. The bottom of the reactor 10 is connected to the bottom of the reservoir 13 by lines 14 and 14a with lift 11 extending from the top of the reactor 10 and discharging into the defoamer 12 above the liquid level of the reservoir 13.

The reservoir 13 may be a rubber-coated conical tank adapted to maintain the liquid level at from five to twenty-five feet or more above the bottom of the reactor 10. Acetic or formic acid is heated to the reaction temperature of between 100 and 200° F. and introduced into the system by line 16.

Amalgamated aluminum in quantities of from 50 to 500 pounds is introduced into the reactor through port 17a and the foam duct 11. The aluminum may be in any suitable form such as one-half inch in diameter pellets. The formation of alumina sol and the evolution of hydrogen begins when the amalgamated aluminum 10b is contacted with the dilute acid solution flowing from the reservoir 13 into the reactor 10. The produced alumina sol of the desired concentration is withdrawn from the reservoir 13 by valved line 19.

In operating the system batchwise, about three-quarters of the produced sol can be removed from the units when the sol has reached the desired concentration, e. g. about 5 weight percent. In a continuous process, when the desired concentration (5% for example) is reached, I may slowly and continuously add dilute acid, slowly and continuously withdraw sol, and add aluminum as needed.

Excess mercury liberated from the amalgam within reactor 12 settles therein and collects in sump 15 and may be withdrawn periodically from the system by valved line 15a. A fume hood 17 having an outlet 18 is provided over the defoamer 12 for removal of vapors and hydrogen.

A typical embodiment of my process for preparing an alumina sol employs reactants in the following proportions:

4000 lbs. water
250 lbs. aluminum metal (pellets or ingots)
10 lbs. HgO
80 lbs. glacial acetic acid Half of the glacial acetic acid may be initially added to the water and the liquid reactants heated to reaction temperature, ordinarily above about 150° F., and additional acid added at spaced intervals. All the acid may be added at the start but in a continuous operation, the stepwise addition of liquid reactants and solid aluminum may be used.

Amalgamated aluminum is charged to the reactor and the formation of alumina sol and evolution of $H_2$ begin when the amalgamated aluminum contacts the dilute formic or acetic acid. The hydrogen produced causes the rapid and positive circulation of the liquid reactants through the pellets of amalgamated aluminum. The resultant alumina hydrosol approaches an $Al_2O_3$ content of from 4 to 5 percent by weight in a reaction time of about 3 to 10 hours. The rate of $Al_2O_3$ sol production can be increased by substituting formic acid for acetic acid since the formic acid sol produces a less stable foam, permitting the use of higher temperatures and faster reaction before defoaming capacity is reached.

The reaction of amalgamated aluminum with water in my process can be carried out at ambient room temperature to as high as 250° F. or above. I prefer, however, to carry out the reaction at about 160° F. The reaction can be carried out under reduced or elevated pressure. However, the temperature and rate of introduction of reactants are selected so as to maintain a relatively constant evolution of hydrogen of sufficient quantity to produce the foam required to assure circulation but to stay within the defoaming capacity of the apparatus.

My invention is illustrated by the following specific examples but it is to be understood that the invention is in no sense limited to the specific process, materials, procedures, or operating conditions.

Example I 5000 ml. of water were heated to about 165° F. and to it was added 100 ml. of glacial acetic acid. 130 grams of aluminum metal were treated with 8 grams mercuric oxide to amalgamate the surface of the aluminum. The amalgamated aluminum was placed in the reactor 10 and the dilute aqueous acetic acid solution fed from the reservoir 13 by hydrostatic pressure. The $H_2$ resulting from the reaction of the aluminum and the dilute acid produced a foam which was lifted in duct 11 (4 feet long and 0.75 inch I. D.) by the pressure differential of the column of foam and the column of liquid. This caused a rapid circulation of liquid into the reactor and of foam into the reservoir-defoamer. 425 ml. of $H_2$ per minute were produced and this resulted in the circulation of 3800 ml./min. of liquid through the reactor 10.

Example II 4000 ml. of 2% acetic acid solution and 210 g. of aluminum pellets amalgamated with 12 g. of HgO were reacted in the same equipment as used in Example I at a temperature of 175° F. At the end of 160 minutes the $Al_2O_3$ content of the sol was 3.90%. When the $Al_2O_3$ content reached 5.1%, the reaction was stopped.

The sols produced in Examples I and II were mixed with ammonium molybdate solution, dried and calcined to give a superior hydroformer catalyst.

Figure 2:
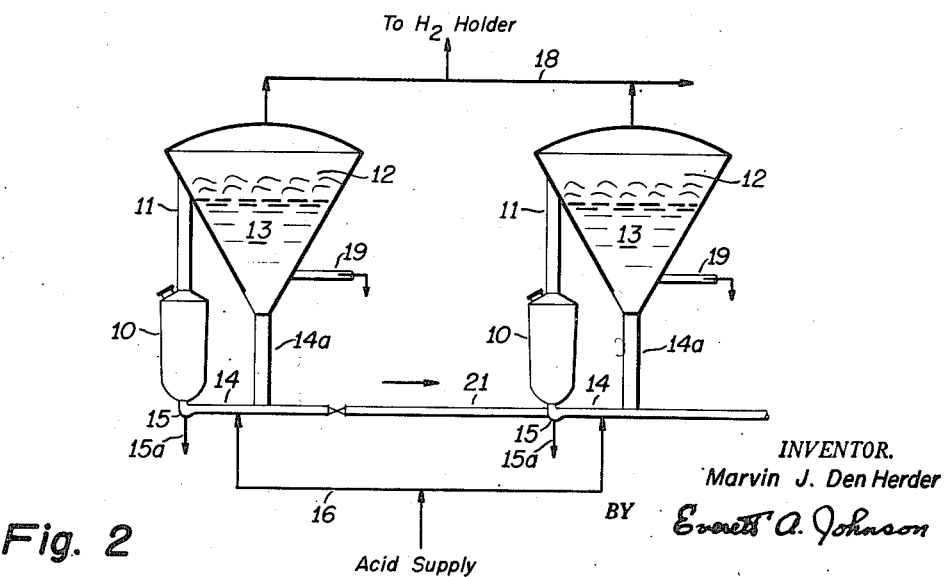
Figure 2 illustrates a form of apparatus adapted to produce a continuous stream of sol prepared in at least two stages.

In Figure 2 the operation is similar to that described in connection with Figure 1 with the exception that the partially completed sol may be passed via line 21 from one contacting and reservoir unit to another and similar unit stagewise. In such an arrangement the liquid reactant introduction (dilute acetic or formic acid) may be introduced from manifold 16 and the evolved hydrogen recovered from the defoamer chamber 12 can be commingled and sent by line 18 to a hydrogen storage holder (not shown). The addition of solid and liquid reactants may be continuous and at a rate permitting the continuous withdrawal of the sol of a desired concentration.

It is also contemplated that either a multiplicity of reactors 10 be associated with a single defoamer-reservoir 12—13 or several defoamer-reservoir units be associated with a single reactor 10 by manifolding the foam duct or lift leg 11 to the several defoamers. In the latter arrangement, aluminum amalgam may be maintained in the reactor with circulation of the liquid reactants from that reactor to an adjacent defoamer-reservoir being continued until the desired concentration of sol is obtained. Upon obtaining such concentration the first defoamer-reservoir unit may be cut off from the reactor and a second similar unit containing dilute aqueous acetic or formic acid supplied to the reactor.

Another embodiment of my invention is illustrated in Figure 3 where I have provided a reactor 25, a foam lift 26, a defoamer 27 superposing a reservoir 28, and a return line 29 having mercury sump 30 and discharging into reactor 25 by inlet line 31. An amalgamator 34 is mounted above the level of the reactor 25 and as the aluminum metal in the reactor 25 is consumed it is replaced periodically or continuously by admitting aluminum from the hopper 34 through valve 37 and line 38 into reactor inlet 39. Alternatively the hopper 34 may discharge into the top of foam lift 26. To produce the amalgamated aluminum in hopper 34, I may supply a mercury solution such as mercuric acetate by line 35 and finely divided aluminum metal by hopper inlet 36. During the time that amalgamated aluminum is in hopper 34, hydrogen gas produced by the reaction of the amalgamated aluminum and water is removed by lines 40 and 40a. Acid is introduced into the reactor 25 by line 33 and recirculation line 29 extending from the bottom of the reservoir 28 to reactor 25.

Circulation of the reactant liquid from reservoir 28 to reactor 25 to defoamer 27 in series is continued by the foam lift 26 so long as there are reactants in the reactor 25 capable of evolving hydrogen to form a lifting foam with the alumina sol solution. The temperature of the system is maintained between about 140 and 180° F. and this temperature is controlled by heat exchanger 42 immersed within the column of liquid confined by the reservoir 28.

Intermittently or continuously a side stream may be taken from the reservoir 28 by line 43. This line may be inclined upwardly from the reservoir as shown in Figure 3 so as to minimize any tendency to withdraw from the reservoir 28 sol which contains suspended mercury or small particles of amalgamated aluminum. Such mercury as may be carried over by the lifting foam settles downwardly through the reservoir 28 and flows by line 29 into sump 30 from which it may be removed by line 32. If desired, the removed mercury can be returned to the amalgamator 34 for amalgamating with additional aluminum. Alternatively, line 43 may discharge into a separation chamber 44 where hydrogen may be stripped from the sol and removed by line 46. The stripped sol may then be withdrawn for further processing if desired, or a portion may be returned by line 47 to the reactor system.

From the above it will be apparent that my system eliminates the need for expensive mixers and pumps and that a rapid circulation of liquid through a reactor is obtained by utilizing the pressure difference between the low density leg of aerated liquid or foam in the lift duct and a higher density liquid leg in the reservoir below the defoamer. Such a system is not limited to use with the particular reactants described but may find utility in any system where recycle of liquid is necessary through a contactor and where there is a liberation of gases in the contacting chamber. Accordingly, although my invention has been described in considerable detail with reference to specific modifications of the apparatus and particular reactants, it is contemplated that changes can be made by those skilled in the art without departing from the scope of the described invention.

I claim:

1. An apparatus for conducting a cyclic chemical reaction involving the evolution of substantial amounts of gas and the production of a large volume of foam, the improvement including an elevated reservoir for the liquid reactants, a reaction chamber disposed substantially below the mid point of the reservoir, the upper portion of said reservoir being of substantially greater diameter than the lower portion of said reservoir, an upwardly extending tubular conduit communicating with the top of the reaction chamber and discharging into said enlarged upper portion of said reservoir, a second conduit communicating with the bottom of said reservoir and the bottom of said reaction chamber, and a solids trap in said second conduit adjacent the inlet of said chamber, whereby circulation of liquid is effected in series from the reservoir, downwardly through the conduit, through the trap, upwardly through the reaction chamber, and upwardly via the first conduit into the enlarged portion of the reservoir.

2. In the method for conducting a liquid-solid reaction wherein a large volume of foam is produced, the improvement which comprises flowing the reactant liquid upwardly through a mass of pelleted solid reactant under the hydrostatic head of a column of the liquid to produce a liquid reaction product and evolve a gas, accumulating a column of foam produced by said gas and product to provide a low density foam leg, discharging the foam upwardly under hydrostatic head of said liquid column into a defoaming zone above said liquid column, separating evolved gases from the foam to resolve the liquid phase, and commingling the said liquid phase with said column for recycle.

3. An improved method for preparing an alumina hydrosol which comprises contacting amalgamated aluminum at an elevated temperature with a dilute aqueous solution of a weak organic acid whereby a mixture of alumina sol and hydrogen is produced in the form of a persistent foam, continuously removing the produced foam from the contacting zone by flowing additional dilute solution under a hydrostatic head from a column thereof upwardly through a mass of amalgamated aluminum, passing the removed foam upwardly in a column, and discharging the separated column of foam into a defoaming zone above the said column of solution whereby hydrogen is liberated from the foam to resolve a liquid phase.

4. In the method for preparing an alumina sol wherein amalgamated aluminum is contacted at a temperature above about 150° F. with a dilute solution of a weak organic acid, and wherein a large volume of foam is produced, the improvement which comprises flowing the dilute solution of weak organic acid upwardly through a mass of pelleted amalgamated aluminum under the hydrostatic head of a liquid column of solution, accumulating a column of foam to provide a low density foam leg, discharging the foam upwardly under hydrostatic pressure of said liquid head into a defoaming zone above said liquid column, separating evolved hydrogen from the foam to resolve the liquid phase, and flowing the liquid phase downwardly through said column for recycle.

5. In the method for preparing an alumina sol wherein aluminum metal is contacted at a temperature above about 150° F. with a dilute solution of a weak organic acid to produce a solution of $Al_2O_3$ with the evolution of hydrogen and the production of a persistent foam, the improvement which comprises maintaining a low density leg of foam above the contacting zone, maintaining a column of liquid in communication with said contacting zone, and causing the circulation of liquid from said column and upwardly through said reaction zone solely as a result of the pressure differential existing between the columns of low density foam and of high density liquid.

6. In the method for preparing an alumina sol which includes contacting aluminum metal at a temperature above about 150° F. with a dilute solution of a weak organic acid to produce a solution of $Al_2O_3$ with the evolution of hydrogen and the production of a persistent foam thereof, the improvement which comprises maintaining a column of liquid solution in communication with said contacting zone, accumulating a low density column of foam above the contacting zone and causing the circulation of liquid from said column and upwardly through said reaction zone to displace foam therefrom solely as a result of the pressure differential existing between the column of low density foam and the column of high density liquid.

References Cited in the file of this patent

UNITED STATES PATENTS

| Number | Name | Date |
|---|---|---|
| 547,816 | Stewart | Oct. 15, 1895 |
| 1,245,807 | Shaw | Nov. 6, 1917 |
| 2,385,200 | Friedel | Sept. 18, 1945 |